(No Model.)
T. B. YALE.
PROCESS OF AND APPARATUS FOR EXTRACTING CRYSTALLIZED SUGAR FROM BAGASSE.
No. 293,838. Patented Feb. 19, 1884.
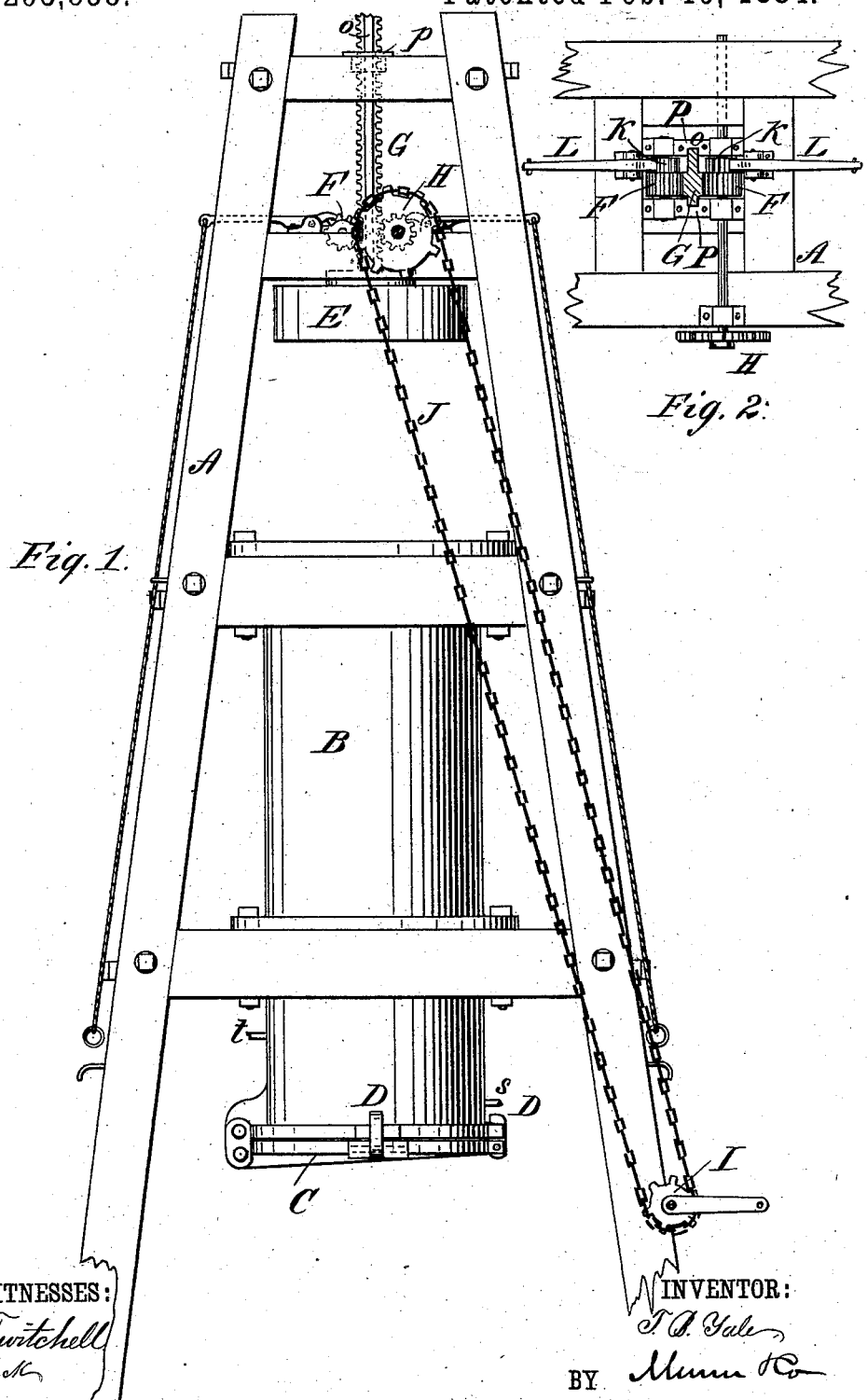

UNITED STATES PATENT OFFICE.

THOMAS BLOSSOM YALE, OF COLUMBIA, TEXAS.

PROCESS OF AND APPARATUS FOR EXTRACTING CRYSTALLIZED SUGAR FROM BAGASSE.

SPECIFICATION forming part of Letters Patent No. 292,838, dated February 19, 1884.

Application filed May 29, 1883. (No model.)

*To all whom it may concern:*

Be it known that I, THOMAS B. YALE, of Columbia, Brazoria county, and State of Texas, have invented a new and Improved Process of and Apparatus for Extracting Juice and Crystallized Sugar from Bagasse, of which the following is a full, clear, and exact description.

By the method commonly used for extracting juice from sugar-cane—that is to say, by the use of rollers—only from forty to sixty per cent. of the juice is recovered and none of the crystallized sugar.

The object of my invention is to save a percentage of this loss in the juice, and also to secure a part, if not all, of the crystallized sugar from the refuse or bagasse or from any other plant producing saccharine matter. To that end I subject the bagasse to a process which extracts the remaining juice and the crystallized sugar by suction and atmospheric pressure, and use for that purpose the apparatus hereinafter specified.

Reference is to be had to the accompanying drawings, forming a part of this specification, in which similar letters of reference indicate corresponding parts in both figures.

Figure 1 is a side elevation of the apparatus which I employ, and Fig. 2 is a plan view of the hoisting-gear.

A is a suitable frame, supporting a cylinder, B, that is fitted at its lower end with a hinged bottom, C.

D D are clamps for retaining the hinged bottom closed.

E is a piston or plunger, made to fit the bore of the cylinder, and fitted for being raised and lowered by a double rack, G, and pinions F F. On the axis of one of the pinions is a chain-wheel, H, from which a chain, J, passes to a lower chain-wheel, I, that is provided with a crank-handle, whereby the pinions F F can be rotated, and the plunger E thus raised and lowered.

At the side of and attached to the pinions F are ratchet-wheels K, which are engaged by pawls L, and to the ends of the pawls cords are connected for use in disengaging the pawls when the piston is to be raised. The object of these pawls and ratchets is to prevent any rising of the piston in case the steam-pressure in the cylinder exceeds the atmospheric pressure.

The rack G is formed at opposite sides with ribs or wings O, passing through guide-plates P P, and the rack is of a length to allow the piston to descend to the bottom of the cylinder.

In the operation, the bagasse, after being placed in the cylinder B and the piston or plunger lowered thereon, is treated by the admission of steam under pressure to the cylinder by a pipe at $t$. The steam will penetrate every part of the fiber and the cells of the crushed cane, and expand the same, so that every particle of the crystallized sugar becomes exposed to the action of the moist steam, and the sugar crystals will be dissolved to a liquid form, ready to be extracted with the juice by the next operation. The air-pump connected to the cylinder by the pipe $s$ is then put in operation after the steam is shut off to exhaust the air in the cylinder and draw the juice and dissolved crystals of sugar therefrom, after which the air-pump is shut off, the bottom of the cylinder is let down, and the material forced out by moving the plunger E downward.

During the operation of the air-pump the plunger will be carried down by atmospheric pressure, thereby compacting the material in the cylinder and aiding in forcing the juice to escape.

For breaking the vacuum when the material is to be removed, a stop-cock may be provided in the cylinder.

I am aware that a process of extracting the juice from sugar-cane, which consists in first reducing the cane to short lengths, then heating it by the direct action of steam in a closed chamber, and, finally, subjecting it to pressure, has heretofore been employed, and I therefore lay no claim to such invention.

Having thus described my invention, I claim as new and desire to secure by Letters Patent—

1. The herein-described process for extracting juice and crystallized sugar from crushed saccharine material, consisting in subjecting said saccharine material in a closed vessel to the action of steam, and then extracting the juice and dissolved crystallized sugar from the saccharine material by means of a vacuum, as set forth.

2. In an apparatus for extracting juice from saccharine materials, the combination, with the cylinder B, having the hinged bottom C and clamps D, and provided with the air and steam pipes *s t*, of the piston E, rack G, pinions F, and means for operating said pinions, substantially as shown and described.

3. In an apparatus for extracting juice from saccharine materials, the combination, with the cylinder B, having the hinged bottom C and clamps D, and provided with the air and steam pipes *s* and *t*, of the piston E, rack G, pinions F, ratchet-wheels K, pawls L, and means for operating the pinions and pawls, substantially as shown and described.

THOMAS BLOSSOM YALE.

Witnesses:
T. L. SMITH,
JNO. H. CRAIG.

Correction in Letters Patent No. 293,838.

It is hereby certified that in Letters Patent No. 293,838, granted February 19, 1884, upon the application of Thomas Blossom Yale, of Columbia, Texas, the invention described and claimed therein was erroneously entitled "Process of and Apparatus for Extracting Crystallized Sugar from Bagasse"; that said title should read, *Process of and Apparatus for Extracting Juice and Crystallized Sugar from Bagasse;* and that the Letters Patent should be read with this correction therein to make it conform to the files and records pertaining to the case in the Patent Office.

Signed, countersigned, and sealed this 1st day of April, A. D. 1884.

[SEAL.]

M. L. JOSLYN,
*Acting Secretary of the Interior.*

Countersigned:
    BENJ. BUTTERWORTH,
        *Commissioner of Patents.*